United States Patent [19]

Halford et al.

[11] Patent Number: 5,927,217
[45] Date of Patent: Jul. 27, 1999

[54] METERING PARTICULATE MATERIAL

[75] Inventors: James William Halford; Jeffrey Mark Slabik, both of Indian Head; Frederick Nicholas Butuk, Insinger, all of Canada

[73] Assignee: Conserva Pak Seeding Systems, Indian Head, Canada

[21] Appl. No.: 08/876,399

[22] Filed: Jun. 16, 1997

[51] Int. Cl.$^6$ .................................................... A01C 7/20
[52] U.S. Cl. .......................................... 111/174; 111/186
[58] Field of Search ................................... 111/173, 174, 111/175, 176, 177, 178, 179, 185, 186, 200; 221/211; 222/148; 206/372, 373; 220/264, 318, 334, 337, 908; 414/217, 416

[56] References Cited

U.S. PATENT DOCUMENTS

| | | | |
|---|---|---|---|
| 3,149,588 | 9/1964 | Gatzke | 111/186 |
| 3,804,036 | 4/1974 | Seifert, Jr. | 111/186 X |
| 4,264,023 | 4/1981 | Stocks et al. | 111/185 X |
| 4,280,419 | 7/1981 | Fischer | 111/174 |
| 4,296,695 | 10/1981 | Quanbeck | 111/186 |
| 4,356,934 | 11/1982 | Knake | 111/174 X |
| 4,379,664 | 4/1983 | Klein et al. | 111/186 X |
| 4,431,115 | 2/1984 | Graham et al. | 221/211 X |
| 4,700,640 | 10/1987 | Andersson | 111/186 |

OTHER PUBLICATIONS

Wil–Rich brochure (6 pages), Aug. 1995.

Primary Examiner—Thomas B. Will
Assistant Examiner—Robert Pezzuto
Attorney, Agent, or Firm—Adrian D. Battison; Murray E. Thrift

[57] ABSTRACT

A supply tank for the individual openers of an air seeder includes two separate tank elements each formed from two separate tanks. Each opener has two supply ducts, one from each tank element. Each tank has a dispensing roller across its bottom metering material into the separate supply ducts. The two tanks of each element feed into a common tube within a closed enclosure dispensing into a feed end of a respective pipe for a respective one of the openers. The pipes within the enclosure are monitored by a camera system so that the operator can see the dispensing of the material on a monitor screen. The tanks are covered by a sealed lid which pivots about a vertical post at one edge. An air supply pressurizes the tanks and a heater selectively heats the air to one of the tanks selected for supplying fertilizer.

22 Claims, 7 Drawing Sheets

METERING PARTICULATE MATERIAL

This invention relates to an agricultural machine for metering particulate material to a number of distribution points on the machine and is particularly but not exclusively concerned with the metering system for an air seeder by which seeds and/or fertilizer are delivered to separate seeding points on the machine.

BACKGROUND OF THE INVENTION

Conventionally air seeders separate or meter the particulate materials including seeds and fertilizer into distribution ducts through which the to materials are carried by an air stream generated by a fan and supplied to the ducts. The metering is effected by providing a series of distribution heads so that the material is initially metered into a pipe and then the distribution heads split the pipe firstly into a first series and then each of the first series is split into a second series. In this distribution head system, blockages are usually monitored by a monitor system which provides a sensor in each duct which is used to detect when the passage of seeds is halted due to a blockage.

An alternative technique for metering the material involves the use of a commercially available system manufactured by Valmar Airflow Inc. which individually meters from a supply tank into a plurality of cups with each cup supplying the metered material into a venturi. In this system, the metering arrangement and tank for a first particulate material such as seeds is arranged on one side of the machine and the metering system for the other materials such as fertilizer is arranged side by side with the first. The metering systems face toward the tractor operator pulling the machine so that the operator can visually see the feeding of the material into the cups and can thus make note of any blockages which occur.

These arrangements have a number of disadvantages and it is one object of the present Invention to provide an improved machine of this general type.

SUMMARY OF THE INVENTION

According to a first aspect of the invention there is provided an agricultural machine comprising:

a supply container for a particulate material for distribution on the machine;

a plurality of supply ducts for distributing the particulate material, each supply duct having a feed end;

an airflow generator for generating an airflow for supply to the supply ducts for transporting the particulate material therealong;

a metering system for metering the particulate material from the container into each of the supply ducts;

the metering system including a plurality of discharge rollers, each discharge rollers being arranged at an opening in the supply container and being rotatable to effect discharge of a metered rate of the particulate material through the opening;

the metering system being arranged to supply from each discharge roller to the feed end of a respective one of the supply ducts the metered rate of the particulate material;

an enclosure containing the metering system and the feed ends of the supply ducts;

and a monitoring system for detecting blockage of one or more of the supply ducts comprising at least one video camera directed to generate an image of a plurality of the feed ends of the supply ducts in the enclosure and a video monitor for viewing of the image by an operator of the machine.

According to a second aspect of the invention there is provided an agricultural machine comprising:

a supply container for a particulate material for distribution on the machine;

a plurality of supply ducts for distributing the particulate material, each supply duct having a feed end;

a metering system for metering the particulate material from the container into each of the supply ducts;

the metering system including a plurality of discharge rollers, each discharge rollers being arranged at an opening in the supply container and being rotatable to effect discharge of a metered rate of the particulate material though the opening;

the metering system being arranged to supply from each discharge roller to the feed end of a respective one of the supply ducts the metered rate of the particulate material;

an enclosure containing the metering system and the feed ends of the supply ducts;

an airflow generator for generating an airflow for supply to the supply ducts for transporting the particulate material therealong;

an air duct connecting airflow from the generator to the enclosure such that airflow from the generator enters each supply ducts through the feed and of the supply duct in the enclosure;

and a plurality of material flow control ducts each extending from a respective discharge roller, so as to receive the metered rate therefrom, to a position at or adjacent the feed end of the respective supply duct.

According to a third aspect of the invention there is provided an agricultural machine comprising:

a first supply container for a first particulate material for distribution on the machine, the first supply container having a width across the machine, a front and a rear;

a plurality of first supply ducts for distributing the first particulate material, each supply duct having a feed end and extending to a respective one of a plurality of use locations on the machine;

the first supply ducts being arranged such that the feed ends thereof are arranged in a single row across the width of the first container and underneath the first container for receiving the first material therefrom;

a first metering system for metering the first particulate material from the first container into each of the first supply ducts;

a second supply container for a second particulate material for distribution on the machine, the second supply container having a width across the machine, a front and a rear;

a plurality of second supply ducts for distributing the second particulate material, each supply duct having a feed end and extending to a respective one of the plurality of use locations on the machine such that each use location is supplied by a respective one of the first supply ducts and a respective one of the second supply ducts;

the second supply ducts being arranged such that the feed ends thereof are arranged in a single row across the width of the second container and underneath the second container for receiving the second material therefrom;

a second metering system for metering the second particulate material from the second container into each of the second supply ducts;

an airflow system for generating an airflow for supply to the first and second supply ducts for transporting the first and second particulate material therealong;

the first container being arranged in front of the second container with the widths of the first and second containers substantially aligned and with the row of feed ends of the first supply ducts parallel to and aligned with the row of feed ends of the second supply ducts.

According to a fourth aspect of the invention there is provided an agricultural machine comprising:

a first supply container for seeds for distribution on the machine;

a plurality of first supply ducts for distributing the particulate material, each supply duct having a feed end and extending to a respective one of a plurality of seeding elements on the machine;

a first metering system for metering the seeds from the first container into each of the first supply ducts;

a second supply container for a fertilizer material for distribution on the machine;

a plurality of second supply ducts for distributing the fertilizer material, each supply duct having a feed end and extending to a respective one of the seeding elements on the machine such that each seeding element is supplied with seeds by a respective one of the first supply ducts and with fertilizer material by a respective one of the second supply ducts;

a second metering system for metering the fertilizer material from the second container into each of the second supply ducts;

an airflow generator for generating an airflow;

the airflow generator being connected to a first air supply duct system for at least communicating air to the first supply ducts for transporting the seeds therealong;

the airflow generator being connected to a second air supply duct system for communicating air to the second container for pressurizing the second container and for communicating air to the second supply ducts for transporting the fertilizer material therealong;

and a heater for supplying heat to the air in the second air supply duct system for drying the air in contact with the fertilizer material.

According to a fifth aspect of the invention there is provided an agricultural machine comprising:

a supply container for a particulate material for distribution on the machine;

a plurality of supply ducts for distributing the particulate material;

an airflow generator for generating an airflow for supply to the supply ducts for transporting the particulate material therealong;

a metering system for metering the particulate material from the container into each of the supply ducts;

the container comprising a tank with a substantially horizontal top and an opening in the top through which material can be fed for filling the tank;

and a cover for the opening in the top, the cover comprising;

a substantially vertical post at one side of the opening;

a cover panel shaped to cover the opening and to define therewith a seat in which the cover panel is located in place on the opening;

an arm having a first end mounted on the post for vertical movement along the post and for rotational movement about a vertical axis longitudinally of the post and a second end connected to the cover panel such that the cover panel is supported in cantilever manner from the post and such that the cover panel is maintained in a plane substantially at right angles to the post;

and a lift actuator for effecting said vertical movement along the post in a first upward direction for vertically lifting the cover panel from the seat to a raised position in which the cover panel is rotatable around said vertical axis to an open position and in a second downward direction in which the arm applies pressure onto the cover panel to locate the cover panel on said seat.

One embodiment of the invention will now be described in conjunction with the accompanying drawings in which.

BRIEF DESCRIPTION OF THE INVENTION

In the drawings like characters of reference indicate corresponding parts in the different figures.

DETAILED DESCRIPTION

Figure 1:
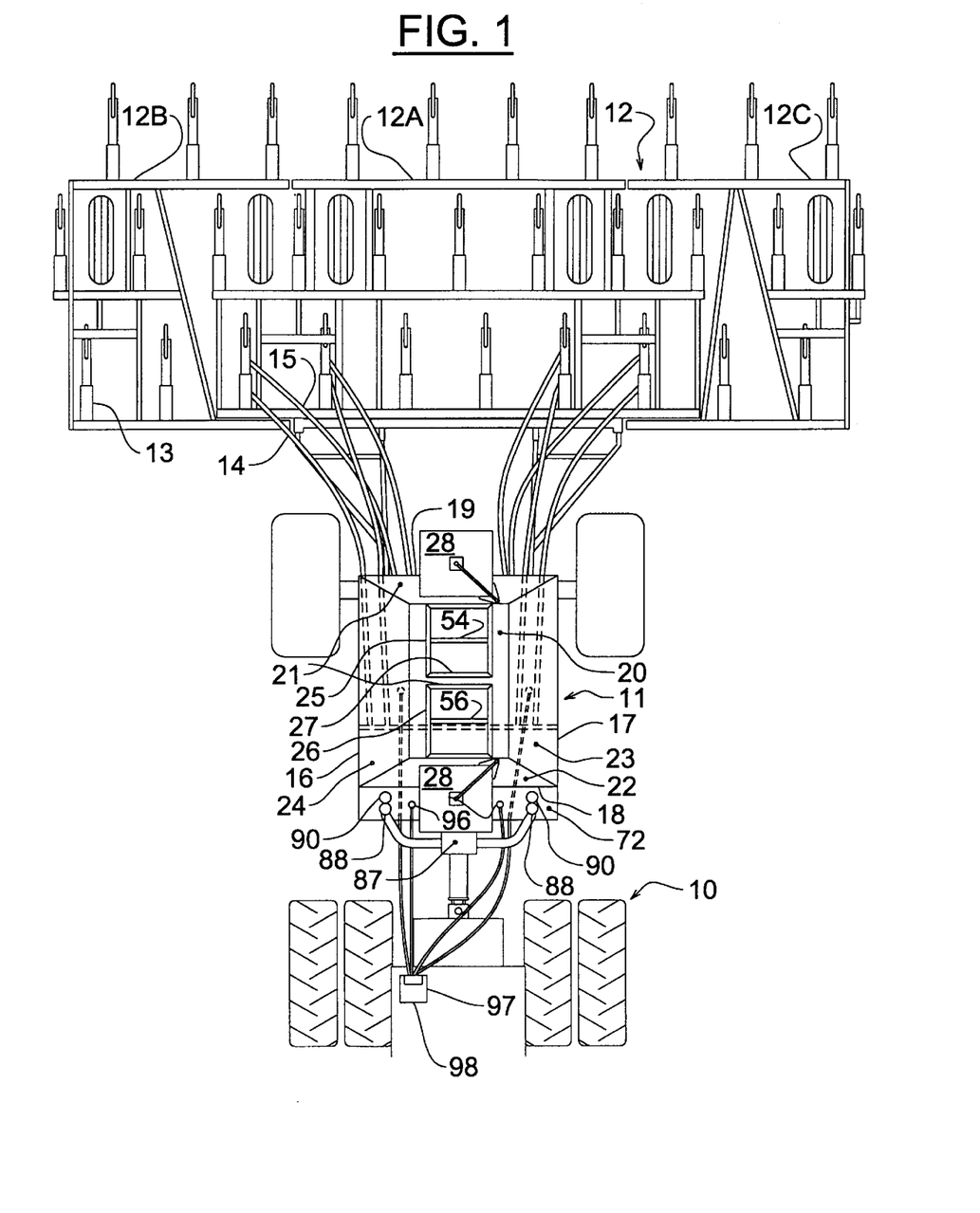
FIG. 1 is a top plan view showing schematically a machine according to the present invention.
Figure 2:
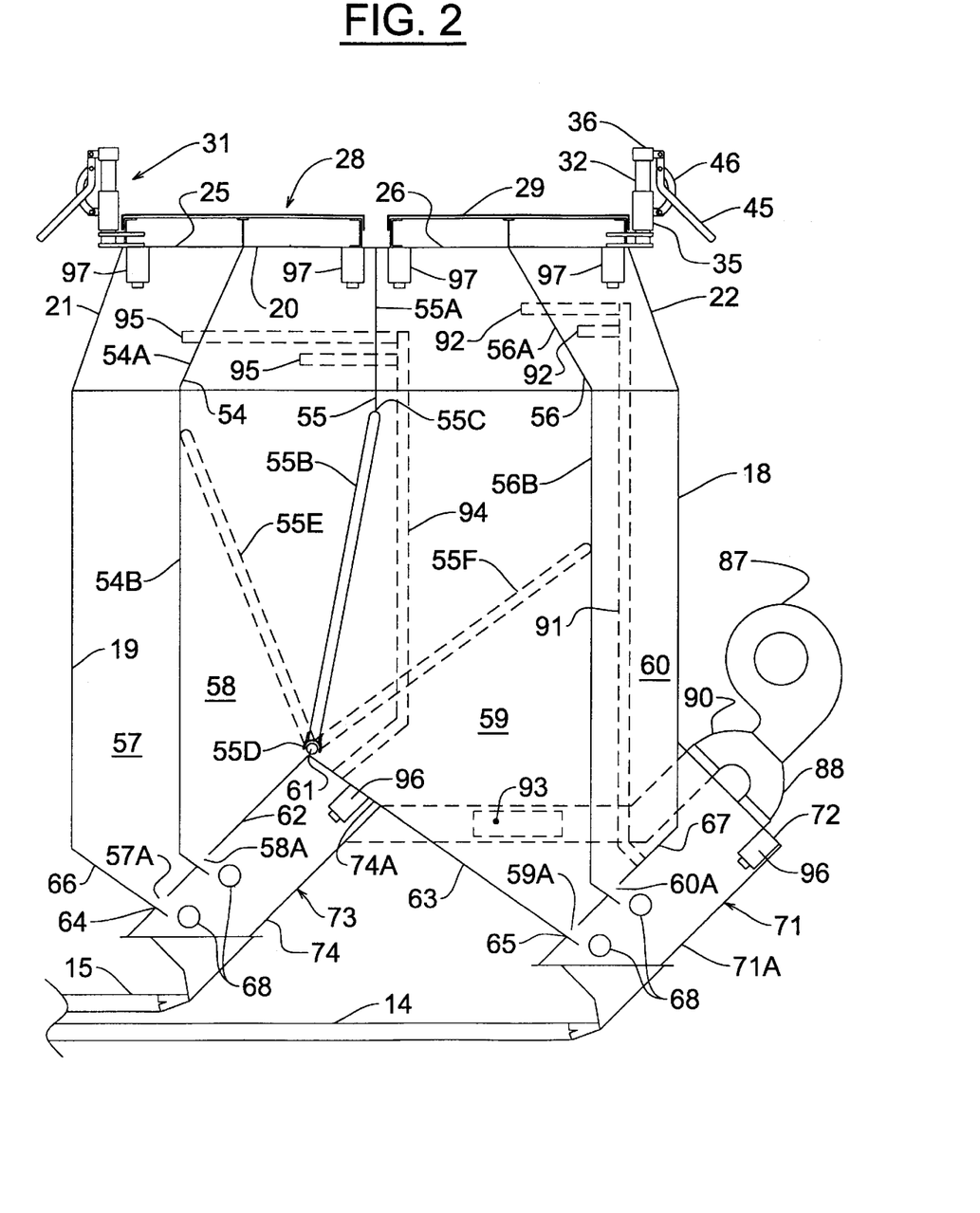
FIG. 2 is a schematic illustration taken from one side of the tank and distribution system of the machine of FIG. 1.

An air seeder system is shown schematically in plan view in FIG. 1 and includes a tractor 10 which pulls a material supply container 11 and a ground working system 12.

The tractor 10 is of a conventional nature and is shown only very schematically since this is of course well known to one skilled in the art. Similarly the ground working system 12 is shown only schematically including a centre section 12A and two wing sections 12B and 12C each of which carries a plurality of ground working elements 13 which operate to apply the particulate material from the container 11 to the ground In conventional manner.

One example of the ground working elements is shown in the prior U.S. Pat. No. 4,762,075 issued Aug. $9^{th}$ 1988 of the present inventor. Other types of ground working implements can be utilized. Each ground working implement 13 receives a first duct 14 and a second duct 15 from the container 11 for transporting the different particulate materials and particularly seeds and fertilizer. In addition other materials can be supplied such as liquid ammonia. The ground working implements are shown only schematically since these will be well known to one skilled in the art and can vary in accordance with requirements. The construction of the frames is shown only schematically since again this can vary in accordance with requirements. The wheels for supporting the frame in transport across the ground are omitted for convenience of illustration. Similarly the wheels for the container 11 are also omitted for convenience of illustration and a container 11 includes a suitable frame structure for mounting on a separate wheel assembly by which it can be towed by the tractor.

The subject of the present invention relates to the container which is shown in a first embodiment in FIGS. 1 through 6. The container 11 comprises a generally rectangular tank having side walls 16 and 17, a front wall 18 and a rear wall 19 all of which are substantially vertical and arranged mutually at right angles to define the main body of the container. A top wall 20 covering the container is horizontal. The top wall connects to the vertical walls by inclined panels including a rear inclined panel 21, a front inclined panel 22 and two side inclined panels 23 and 24.

In the horizontal top surface 20 is provided two openings 25 and 26 through which four compartments inside the container can be filled with the required materials from a supply truck using conventional filling systems.

Each opening is surrounded by a raised channel member 27 which has a C-shape facing inwardly of the opening and connected at the corners to define a rigid rectangular structure. The openings 25 and 26 are arranged so that the edges are spaced inwardly from the edges of the top surface 20 and are dimensioned so as to be sufficiently large to receive the filling system.

The neck defined by the raised channel member 27 is covered by a cover plate 28 which has a rectangular cover surface 29 and a depending side edge 30 arranged around the periphery of the rectangular cover surface. The dimensions of the cover surface 29 are arranged such that the depending side edge 30 is located immediately outside the vertical outside surface of the channel member 27.

Figure 5:
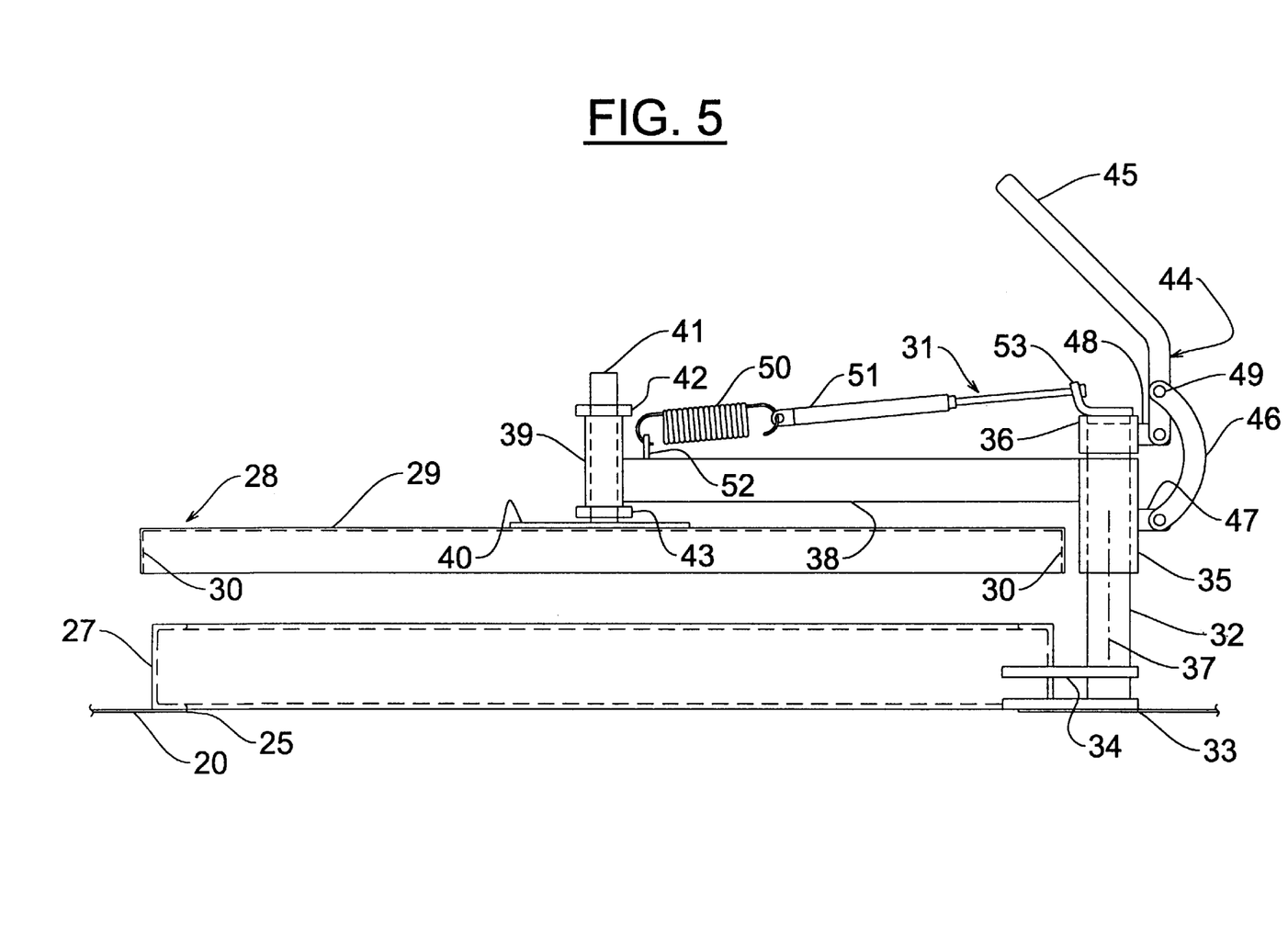
FIG. 5 is a vertical cross sectional view through the tank cover of FIG. 2 on an enlarged scale.

The cover panel 28 is moved to an open position by a lifting and hinge mechanism generally indicated at 31 in FIG. 5. The lifting mechanism 31 comprises a post 32 mounted at one corner of the opening and carried on a pair of horizontal support flanges 33 and 34 attached to the channel member 27 adjacent one corner so that the post 32 is located at the corner spaced outwardly from the corner and standing vertically upwardly therefrom that is at right angles to the horizontal opening 25.

On the post 32 is mounted a sleeve 35 which can slide vertically on the post. At the top of the post is mounted an end cap 36 which is held against vertical movement relative to the post. The post is cylindrical and the sleeve 35 and the end cap 36 both have cylindrical inner surface so that both are rotatable around the vertical axis 37 of the post.

A horizontal arm 38 is attached to the upper end of the sleeve 35 and extends outwardly therefrom at right angles to the axis 37. The arm 38 is thus carried by the sleeve and moves upwardly and downwardly with the sleeve. At an outer end of the arm 38 is mounted a further sleeve 39 which is parallel to the sleeve 35. On the top of the surface 29 is mounted a reinforcing plate 40 to which is attached a threaded rod 41 standing vertically upwardly from the surface 29. The threaded rod is attached to the sleeve 39 by a pair of nuts 42 and 43. The axial position of the threaded rod within the sleeve 39 can therefore be adjusted by moving the nuts 42 and 43 longitudinally of the threaded rod. When adjustment is complete, the threaded rod is fixed to the sleeve 39 for movement therewith.

Figure 6:
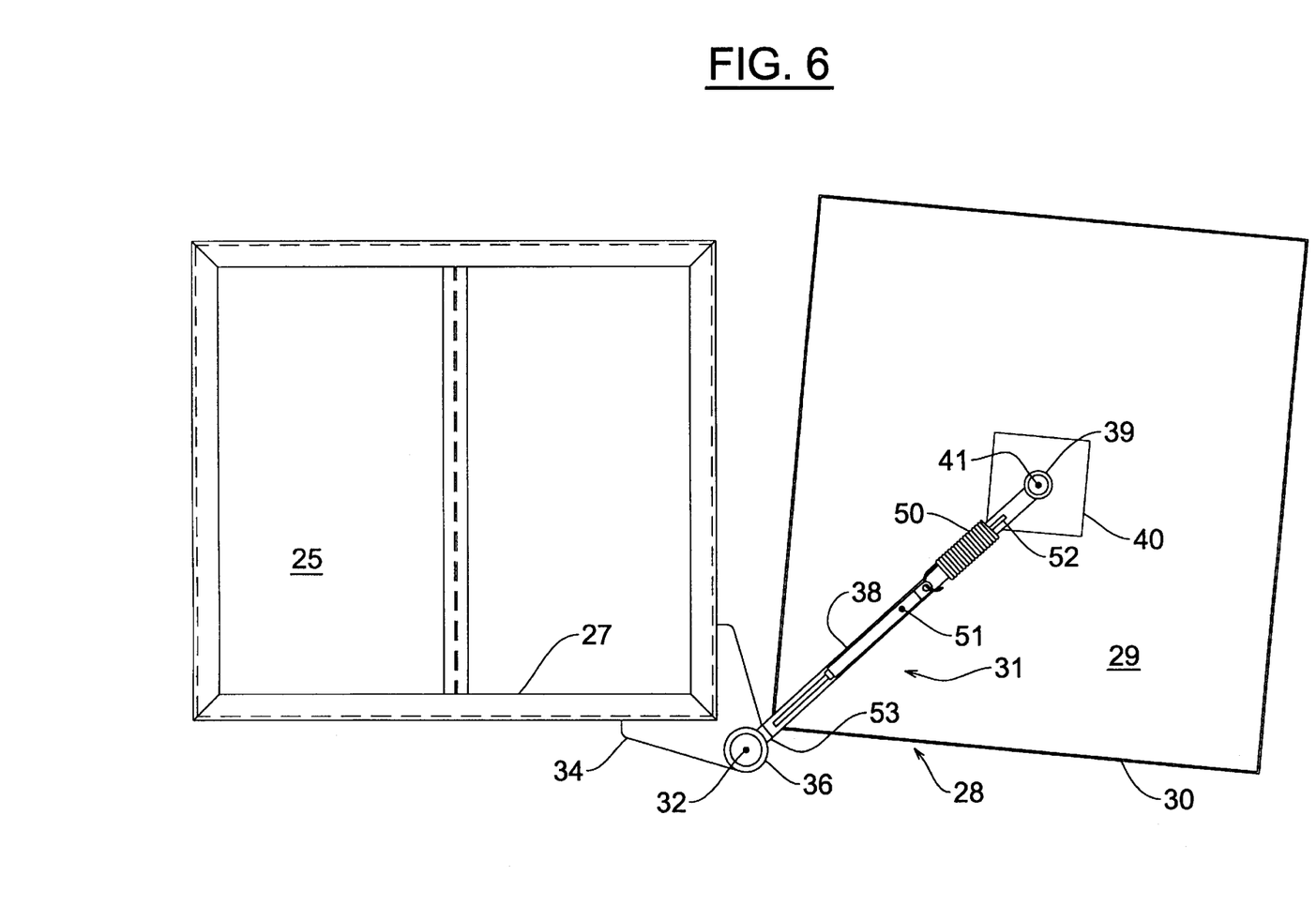
FIG. 6 is a top plan view of one part of the tank and the tank cover of FIG. 2.

Thus vertical movement of the sleeve 35 along the post 32 acts to lift the cover panel 28 from a position sitting on the channel member 27 to a raised position as shown in FIG. 5 in which the lip 30 is spaced upwardly from the upper surface of the channel member. In this position the arm 38 can pivot about the axis 37 as shown in FIG. 6 to move the cover panel to a position rotated around the post 32 and spaced away from the opening allowing direct vertical access to or parts of the opening. As the threaded rod 41 is fixed to the sleeve 39, the orientation of the arm relative to the cover panel remains unchanged as the arm rotates.

Lifting movement of the sleeve 35 on the post 32 is effected by a lifting mechanism 44 comprising a lever 45 and a link 46. The link 46 has a lower end connected to a lug 47 on the sleeve 35. The lever 45 has a lower end connected to a lug 48 on the collar 36. The link 46 has an upper end pivotally mounted on a pin 49 carried on the lever 45 at a position above the lug 48. The link 46 is curved. The lever 45 and the link 46 thus act as overcenter lifting mechanism having two stable positions shown respectively in FIGS. 2 and 5. In the lowered position shown in FIG. 2, the lever is rotated outwardly and downwardly to a position which the pin 49 is between the lugs 47 and 48 thus pushing the lug 47 downwardly and applying downward pressure to the arms 38 and therefore to the cover panel 28 onto the channel member 27. In the lifted position shown in FIG. 5, the lever is rotated upwardly and inwardly so that the pin 49 is moved to a position above the lug 48 thus moving the sleeve 35 upwardly to a position adjacent the collar 36. The amount of movement is sufficient to allow the lip 30 to clear the channel member 27. The amount of downward movement is sufficient to apply pressure of the cover panel onto the channel member sufficient to effect at least a partial seal therebetween to allow pressurization of the container as described hereinafter.

A support linkage extends along the arm 38 from the cap 36 and includes a spring 50 connected to an adjustable rod 51. The spring 50 has one end attached to a lug 52 on the arm 38 and the rod 51 has its opposed end attached to a tab 53 on the cap 36. The spring thus applies a lifting force between the cap and the arm. This lifting force reduces the twisting action on the sleeve 35 caused by the cantilever effect of the arms 38 so that the sleeve 35 can slide smoothly on the post 32 without chatter.

The lifting and opening mechanism 44 for the door panel thus allows the door panel to remain In a horizontal orientation while moving between the open and closed positions so that it is not significantly affected by wind gusts. The lifting movement is only a few inches 80 that the door panel remains at a very low height without danger of contacting surrounding objects. The user can therefore very simply move the door panel from the lowered sealing position into a raised position and swing the door to an open position using little effort.

The container 11 is partitioned transversely by three dividing walls 54, 55 and 56 into four compartments 57, 58, 59 and 60. The dividing walls 54, 55 and 56 extend transversely across the container so that each compartment comprises the full width of the container but only a part of the length of the container.

The dividing wall 55 includes an upper portion 55A located substantially centrally of the length of the container. The dividing wall 54 includes an upper portion 54A commencing centrally of the opening 25 and extending therefrom downwardly and toward the rear wall 19. Thus the rear compartment 57 is smaller than the compartment 58 in that it has an opening at the opening 25 which is the same size as the opening of the compartment 58 but is reduced in size by the inclined upper wall section 54A. The divider wall 54 includes a lower portion 54B which is vertical and extends downwardly from the bottom of the upper portion 54A to the bottom area of the tank. The divider wall 56 is substantially symmetrical to the divider wall 54 in that it includes an upper portion 56A commencing halfway across the opening 26 and a lower portion 56B arranged closer to the front wall 18 so that the compartment 60 is smaller than the compartment 59. The dividing wall 55 includes the upper portion 55A which extends downwardly to a lower edge 55C arranged within the area of the vertical portions of the side walls. The dividing wall 55 includes a lower portion 55B in the form of a rectangular panel having a lower edge 55D mounted on a hinge 61. Thus the lower rectangular panel can pivot from a central or normal position in which the upper edge of the panel 55B is connected to the lower edge 55C of the upper portion 55A thus normally dividing the compartments 58 and 59. In a first alternative position, the panel 55B is moved to a position shown in dotted line at 55E in which the panel lies against the divider portion 54B. In a third alternative position, the panel is moved forwardly to a position in contact with the divider wall portion 56B as indicated at 55F. Thus the divider panel 55B can be moved between the three positions. In the central normal position, the two compartments 58 and 59 are separated and can operate independently to receive and discharge separate particulate materials. The compartment 59 in this position is larger than the compartment 58 since it is common that the volume of seed will exceed the volume of fertilizer material. Thus the panel 55B is inclined downwardly and toward the rear wall 19 to the lower end 55D which is offset toward the rear wall 19.

In the position 55E the compartment 58 is in effect closed off so that the upper portion of the compartment 58 defines now a portion of the compartment 59 which is therefore of significantly increased size.

The third position 55F has a similar effect that the lower portion of the compartment 59 is in effect closed and the upper portion of the compartment 59 is in communication with the compartment 58 and supplies material to the compartment 58.

The user therefore has the flexibility of selecting from the central two compartments either a single compartment or two individual compartments and these are used in conjunction with the front and rear compartments. Thus four separate materials may be supplied for distribution or the container may be divided into three separate compartments, one of which is large and the front and rear ones of which are relatively small. Of course one or more of the compartments may be left empty if not required.

Each of the compartments 57, 58, 69 and 60 has a respective one of four discharge openings 57A, 58A, 59A and 60A at its lower end. The respective discharge openings extend across the full width of the compartments that is from one side wall 16 to the opposite side wall 17. Forwardly of each discharge opening, the bottom wall of the container extends downwardly and rearwardly. Rearwardly of each discharge opening, the container extends downwardly and forwardly such that the particulate material in the compartments flows to the discharge opening which is in effect therefore at an apex defining the lower most part of the compartment.

Thus the hinge 61 is arranged at an apex of two lower wall portions 62 and 63 of the container. The lower wall 62 extends from the apex at the hinge 61 downwardly and rearwardly to a lower most edge 64 at the discharge opening 57A. The bottom wall portion 63 extends downwardly and forwardly to a lower most edge 65 at the discharge opening 59A. At the bottom of the compartment 57 is provided a bottom wall portion 66 which extends downwardly and forwardly to intersect with the wall portion 62. At the bottom of the compartment 60 is provided a bottom wall portion 67 which extends downwardly and rearwardly to intersect with the wall 63 at the apex 65.

The discharge openings 57A and 58A are arranged closely adjacent and adjacent the bottom of the wall 62. Similarly the discharge openings 59A and 60A are closely adjacent and adjacent the bottom of the wall 67.

Each discharge opening has associated with it a respective roller. The rollers are generally of the type manufactured by Valmar Airflow inc. of Elie Manitoba and include a common drive shaft 68 on which is carried a plurality of metering wheels 69 at spaced positions along the length of the shaft. Rotation of the shaft about its axis drives the metering wheels so as to sweep the particulate material from the respective compartment at a predetermined metered rate depending upon the rate of rotation of the shaft 68. This type of metering system is well known and has been manufactured for up to twenty years and therefore it is described only briefly and shown only schematically. Further details will be well known to one skilled in the art and can be found from studying the products of the above mentioned company.

Figure 3:
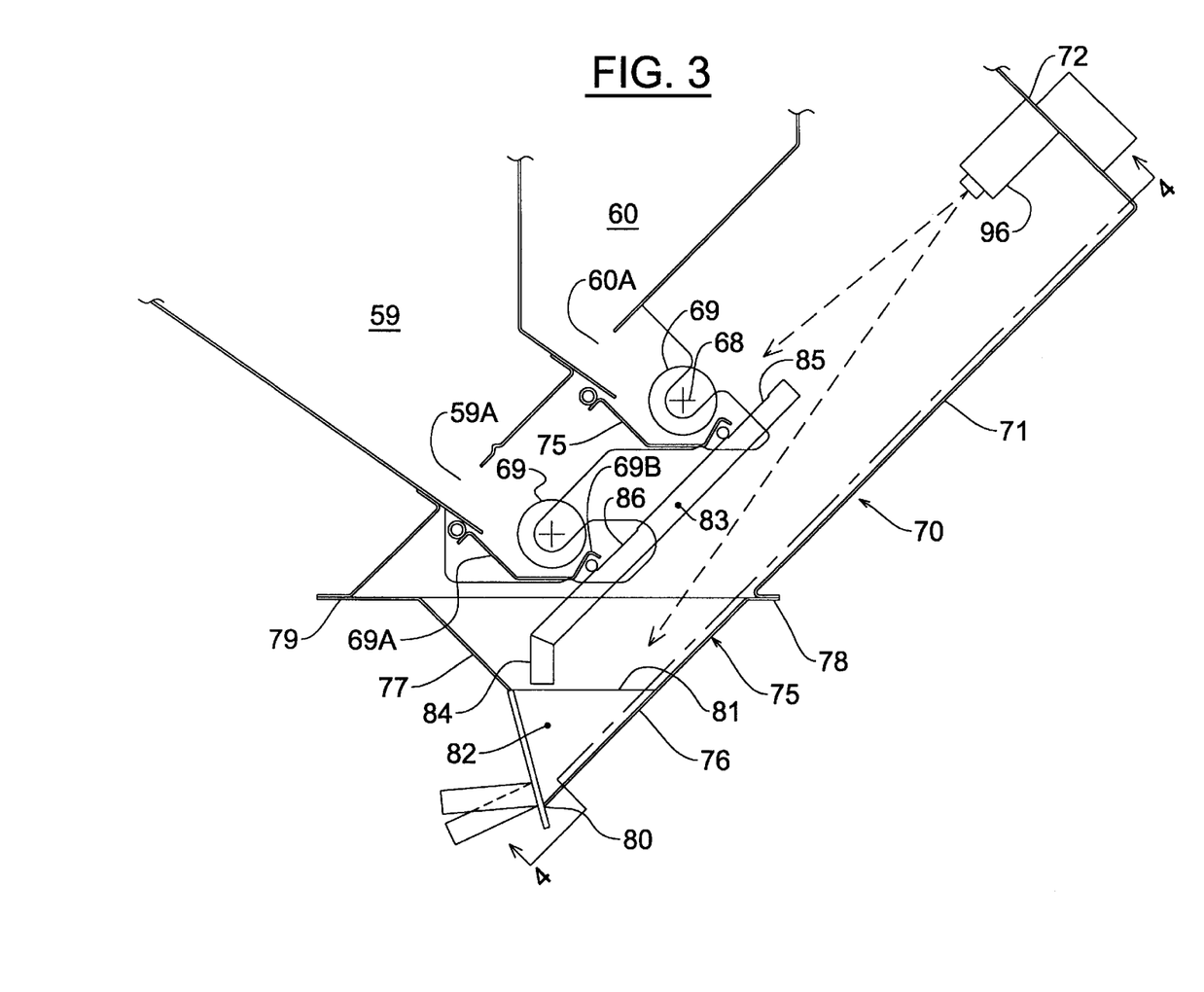
FIG. 3 is a cross sectional view on an enlarged scale of the forward tanks only of FIG. 2.

As best shown in FIG. 3, the metering wheels or roller elements 69 are located in discharge troughs 69A which hold the particulate material at the discharge opening of a respective compartment and allow the metering wheel to rotate in a counter clock wise direction sweeping the particulate material over a lip 69B of the trough for meter to discharge from the compartment.

The shafts 68 thus extend across the full width of the container from the side wall 16 to the side wall 17 and are driven at one end by suitable drive mechanism which can be varied to vary the rate of metering.

The number of metering wheels or roller elements 69 is equal to the number of ducts 14/15 to be fed.

The metering wheels or roller elements 69 of the compartments 60 and 59 are located within a first compartment 70 mounted at the bottom of the compartments 59 and 60. Thus the compartment 70 includes a bottom wall 71 parallel to the wall 67 and an upper wall 72 at right angles to the bottom wall 71 and extending from an upper edge of the wall 71 to the front wall 18.

Similarly the discharge rollers of the compartments 57 and 58 are located within a second compartment 73 at the bottom of those compartments and defined by a bottom wall 74 parallel to the wall 72 and a front wall 74 Which forms part of the wall 63.

The compartments 70 and 73 are in effect symmetrical. The compartment 70 and 73 each close the area containing the metering rollers. Each of the compartments comprises side walls which are in effect defined by extensions of the side walls 16 and 17.

Figure 4:
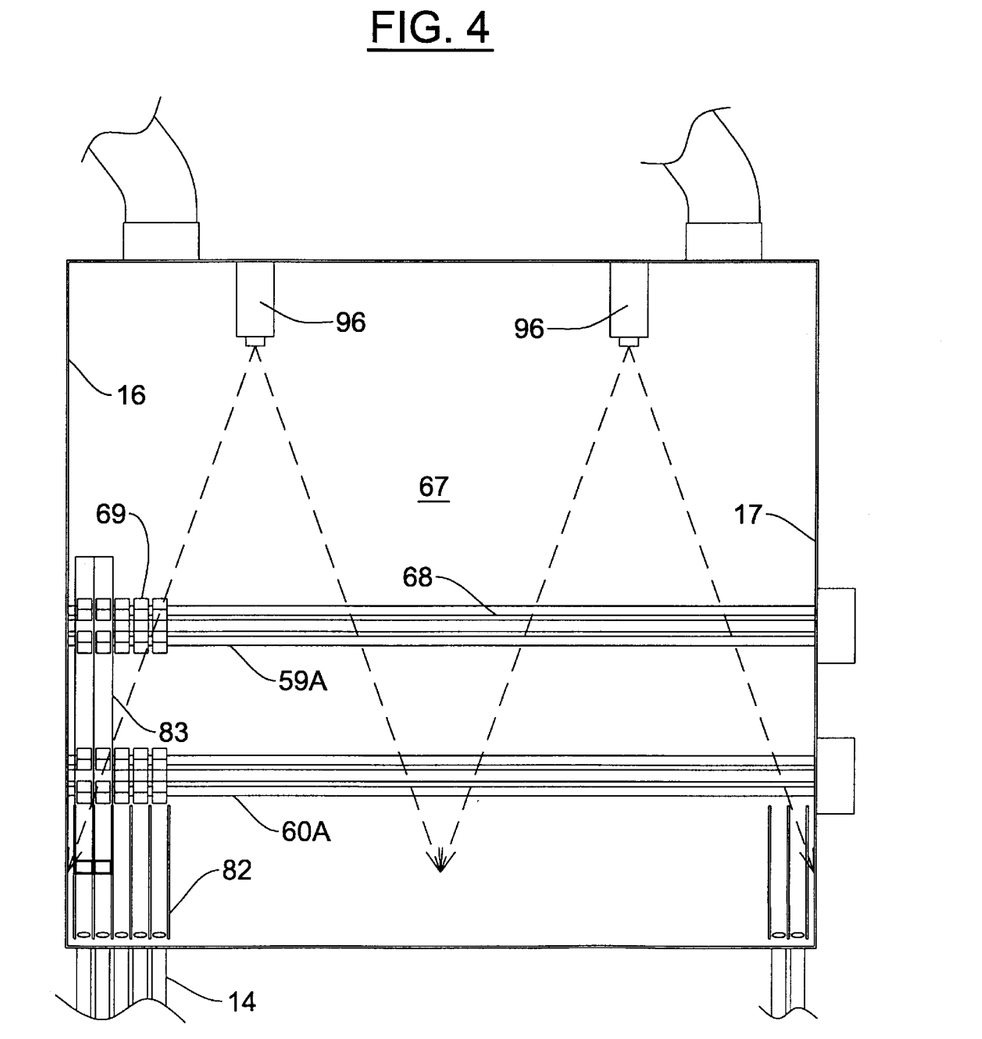
FIG. 4 is a cross sectional view along the lines 4—4 of FIG. 3.

A bottom part of each compartment 70, 73 is formed by a hopper section generally indicated at 75. This hopper section includes a front wall 76 forming in effect a continuation of the wall 71 and a rear wall 77. The hopper 75 is formed as a separate section so that it can be bolted to the lower part of tho compartment by flanges 78 and 79. The hopper 75 thus forms a generally triangular shape converging the material discharged from the metering rollers toward a bottom apex 80. Adjacent the apex 80, the hopper includes a plurality of dividing walls 81 separating the hopper into a plurality of hopper sections. The dividing walls extend parallel to the side walls 16 and 17. The dividing walls are aligned so that the compartment defined by each pair of dividing walls is aligned with a respective one of the metering wheels as best shown in FIG. 4 so that material from the metering wheels can be deposited into respective ones of the triangular compartments. Each compartment connects with a respective one of a plurality of the ducts 14/15 which are arranged in a row across the width of the container.

Thus at the bottom of the compartment 70 is provided a row of the ducts 14. The number of ducts 14 at the compartment 70 is equal to the number of ground working implements and the ducts are arranged in a single row across the full width of the container. Similarly the ducts 15 are arranged in a single row across the bottom of the compartment 73.

An opening and a cover plate can be provided in the bottom wall 76 to allow cleanout of the compartments at the end of a process.

Each of the metering wheels 69 therefore has associated with it a respective one of the triangular compartments as indicated at 82. Each triangular compartment 82 is located at a feed end of a respective one of a plurality of supply tubes 83. Each supply tube is separate from the other supply tubes and has a discharge mouth 84 dispensing directly into the respective triangular compartment 82. Each tube 83 has a first opening 85 for receiving metered material from the compartment 60. Each tube has a second opening 86 to receive material from the compartment 59. Apart from these openings, the tubes are in effect closed so that the material is directly metered into the tube and then flows down the tube for communication to the specific triangular compartment 82. The upper end may be open or closed. The tubes 83 are formed from square tubing with each having sides directly in contact with the next adjacent tubes so that the array of tubes forms a closed bank across the area under the rollers 69 with openings formed in the upper wall of the tubing to receive the metered material.

In an alternative arrangement, the triangular divider plates can be omitted so that the tubes feed directly into the ducts 14/15. Also the divider plates can be formed for ready removal to allow easier cleanout.

The particulate material metered into the triangular compartments 82 enters the feed end of and is transported through the ducts 14 and 15 to the ground working implements by airflow generated by one or more fans 87. The fan or fans 87 is sufficiently large to provide air flow for all of the ducts 14 and 15 and a single fan supplies air to both of the compartments 70 and 73 or each is supplied by its own fan. Thus the compartments 70 is supplied with air from the fans 87 through two ducts 88 connected to the end wall 72 at spaced positions across the width of the end wall 72. The ducts 88 thus inject air into the compartment 70 and that air exits from that compartment through the triangular compartments 82 and the ducts 14 at the bottom of those compartments. The air thus moving in this direction picks up the particulate material metered into the triangular compartments and carries it through each of the ducts 14. The tubes 83 allow the material to be carried to the respective triangular compartment without disturbance from the airflow passing through the compartment 70. The tubes also prevent any sideways tilting of the container on uneven ground from causing material to enter different ones of the triangular compartments. The two separate materials from the compartment 60 and 59 are therefore properly metered to each triangular compartment and fed to each duct 14 for transportation through the duct by the air stream from the air ducts 88.

The compartment 73 is similarly fed with air from the fan 87 through a pair of air ducts 90 which extend through an upper part of the wall 72 and through the compartments 59 and 60 to the compartment 73 either at the bottom wall 74 or at the upper wall 74A. The compartment 73 thus operates symmetrically to the compartment 70 in that the air stream from the ducts so operates to transport the materials through the ducts 15.

The compartments 59 and 60 are pressurized by bleed ducts 91 which carry air from the compartment 70 upwardly to the top of the compartments 59 and 60 for discharge through openings 92 into a respective compartments. Thus air is prevented from feeding back from the compartment 70 into the compartment 59 and 60 past the metering system by the pressure within the compartments 59 and 60.

Downstream of the bleed ducts 91, the ducts 90 each contain a heating element 93 for heating air flowing through the ducts 90 for supply to the compartment 73 and to the compartments 57 and 58. Further bleed ducts 94 are connected to the compartment 73 so as to receive air from the compartment 73 downstream of the heating elements 93 and communicate pressurized air to each of the compartments 57 and 58 through outlet openings 95 at the top of those compartments.

The heater element 93 can be supplied with heat from various different sources including heat exchange from the drive engine of the tractor either using the exhaust as a supply or the coolant as a supply. Alternatively heat can be supplied from a combustion source or electrically. The heat from a heating element 93 is used to dry the air prior to communication of that air into the compartments 57, 58 and 73. These compartments are used for fertilizer rather than for seed and it is highly desirable that the fertilizer be contacted only with relatively dry air to prevent moisture contamination of the fertilizer. The heating element 93 is therefore applied downstream of the fen and only within the air which is required to be heated for transmission to the fertilizer section of the container.

In seeding systems of this type, it is highly desirable to monitor blockages of the ducts 14 and 15 adjacent the ground working implements caused by soil or other debris entering the duct at its lower end.

In the present arrangement monitoring of such blockages is effected by four video cameras 96 communicating information to a monitor 97 in the tractor and selectable by a switch 98 at the monitor. Two of the cameras 96 are located in or on the compartment 70 and two of the cameras are located in or on the compartment 73. The cameras are mounted on the rear wall of the respective compartment directed in their field of view toward the triangular compartments 82 so that the camera generates an image of the row of triangular compartments. The camera body can be outside the wall and view through an opening in the wall or a window in the wall. In view of the fact that the containers relatively wide and the row of triangular compartments is relatively long due to the relatively high number of individual ducts, it is necessary to provide two such cameras at positions spaced across the width of the compartment so that each views one half of the triangular compartments.

In operation of the monitoring system, therefore, the tractor operator switches between the individual images from the four cameras so that the operator can view in turn one quarter of the triangular compartments to see whether material is backing up in those compartments. Any blockage of one of the ducts will cause the material to back up due to the halting of the air flow through that duct and this backup will occur at the triangular compartment and can be readily seen from the image generated by the camera.

The level of filling of the compartments 57, 58, 59 and 60 can be detected by cameras 99 mounted at suitable locations within the respective compartment. The image from the cameras can be selected and viewed repeatedly by the operator using the switch 98.

Figure 7:
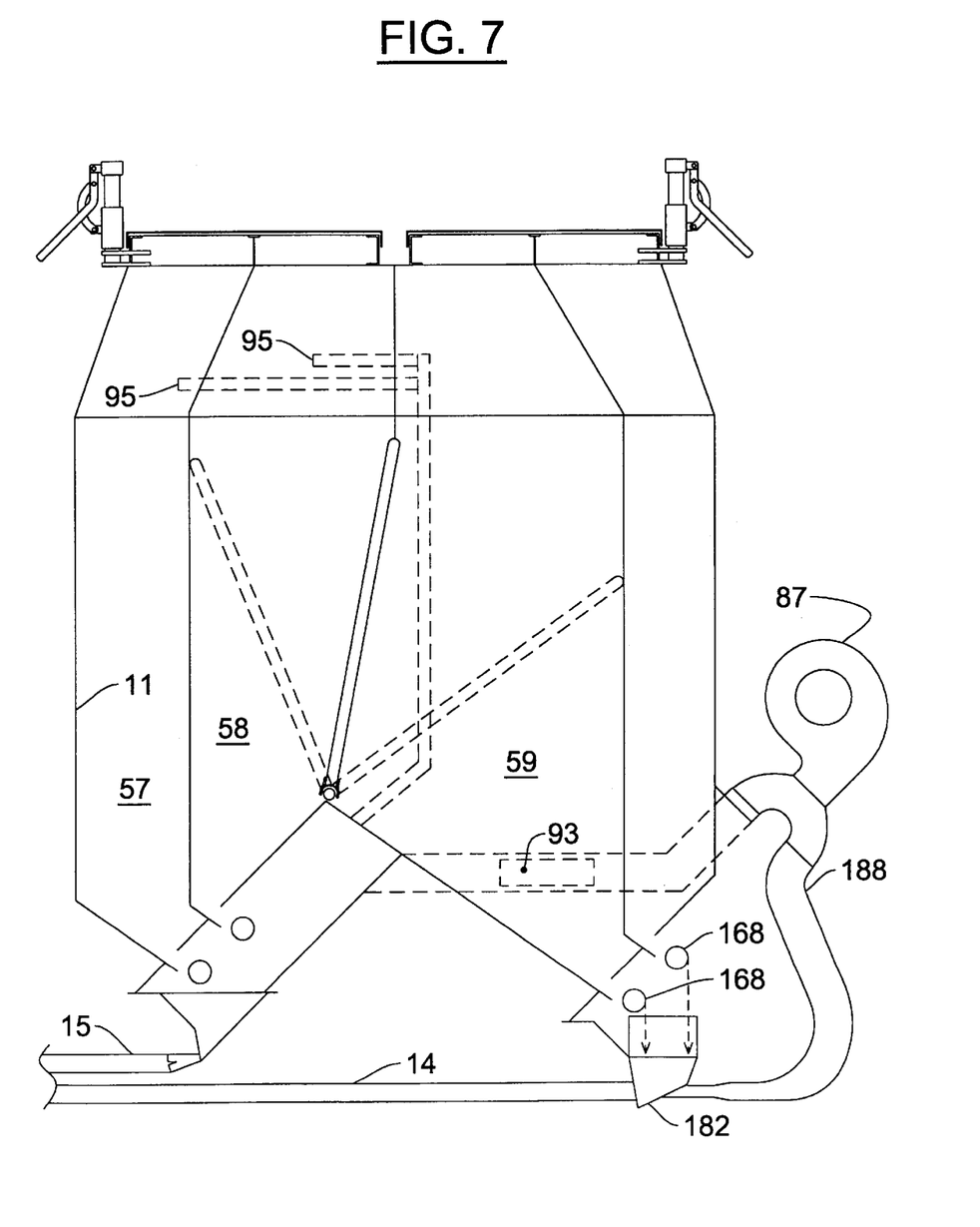
FIG. 7 is a schematic illustration similar to that of FIG. 2 showing a modified arrangement.

In FIG. 7 is shown a modified arrangement using the same container 11 having the compartments 57, 58, 59 and 60. In this arrangement, however, the compartment 70 is omitted and the metering rollers 168 at the bottom of the compartments 59 and 60 are open to the atmosphere for direct viewing by the operator. The system is therefore somewhat similar to that utilized in the prior mentioned Valmar air flow system in which the metering rollers are open to view and feed directly into venturi cups 182 fed by individual ducts 188. Each material duct 14 is therefore associated with a respective one of the air ducts 188 and passes through a respective venturi cup 182. In this arrangement, therefore, the pressurized system is used only for the fertilizer side of the container and seed side of the container is open to the atmosphere where moisture is generally irrelevant.

The seed compartments 59 and 60 are therefore arranged back to back with the fertilizer compartments, connecting at the dividing wall 55. Both compartments extend across the full width of the container and each supplies a single row of the ducts 14, 15. This configuration provides accurate metering to the individual supply ducts 14, 15 without necessity for splitting of those ducts.

In a further arrangement, a filter basket is mounted on the top wall of the container on a post similar to that used for the cover panels. This basket can be moved to one or other of the openings 25, 26 and placed into the opening, having the same shape as the opening, to act to filter material fed into the container to extract lumps and foreign bodies. The basket can include a cover sheet covering one half of the area of the opening and pivotal about a hinge line across the opening so that the cover sheet can cover one of the compartments while the other is being filled through the filter part of the basket.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An agricultural machine comprising:

a supply container for a particulate material for distribution on the machine;

a plurality of supply ducts for distributing the particulate material, each supply duct having a feed end;

an airflow generator for generating an airflow for supply to the supply ducts for transporting the particulate material therealong;

a metering system for metering the particulate material from the container into the feed end of each of the supply ducts;

the metering system including a discharge roller assembly arranged at the supply container and being rotatable to effect discharge of a metered rate of the particulate material from the supply container;

the metering system being arranged to supply from the discharge roller assembly to the feed end of a respective one of the supply ducts the metered rate of the particulate material;

an enclosure containing the metering system and the feed ends of the supply ducts;

and a monitoring system for detecting blockage of one or more of the supply ducts comprising at least one video camera directed to generate an image of a plurality of the feed ends of the supply ducts in the enclosure and a video monitor for viewing of the image by an operator of the machine.

2. The machine according to claim 1 wherein the supply ducts are arranged in a single row across the enclosure and wherein the discharge roller assembly is arranged in to define a row of discharge roller elements for deposit of the metered material from the row onto the feed ends of the row of supply ducts.

3. The machine according to claim 1 wherein there are at least two video cameras at positions spaced longitudinally of the row of supply ducts and arranged at positions for viewing the feed ends of the row of supply ducts such that each video camera views some of the supply ducts of the row of supply ducts.

4. The machine according to claim 1 wherein the enclosure includes an end wall opposite to the feed ends of the supply ducts and wherein the at least one video camera is mounted on the end wall.

5. The machine according to claim 1 wherein there is an air duct connecting airflow from the generator to the enclosure such that airflow from the generator enters each of the supply ducts through the feed end of the supply duct in the enclosure.

6. The machine according to claim 5 wherein there is provided a plurality of material flow control ducts each extending from a respective discharge roller so as to receive the metered rate therefrom to a position adjacent the feed end of the respective supply duct.

7. The machine according to claim 6 wherein there is provided a second supply container and a second metering system for metering particulate material from the second container into each of the supply ducts, the second metering system including a second discharge roller assembly arranged at the second supply container and being rotatable to effect discharge of a metered rate of the particulate material from the second supply container, the second metering system being arranged to supply from the second discharge roller assembly to the feed end of a respective one of the supply ducts the metered rate of the particulate material.

8. An agricultural machine comprising:

a supply container for a particulate material for distribution on the machine;

a plurality of supply ducts for distributing the particulate material, each supply duct having a feed end;

a metering system for metering the particulate material from the container into each of the supply ducts;

the metering system including a discharge roller assembly arranged at the supply container and being rotatable to effect discharge of a metered rate of the particulate material from the supply container;

the metering system being arranged to supply from the discharge roller assembly to the feed end of a respective one of the supply ducts the metered rate of the particulate material;

a closed enclosure containing the metering system and the feed ends of the supply ducts;

an airflow generator for generating an airflow for supply to the supply ducts for transporting the particulate material therealong;

an air duct connecting airflow from the generator to the closed enclosure at a position thereon spaced from the feed end of the supply ducts such that airflow from the generator pressurizes the enclosure and passes through the enclosure before entering each of the supply ducts through the feed end of the supply duct in the enclosure;

and a plurality of material flow control ducts each associated with a respective one of the supply ducts and each extending from the discharge roller assembly, so as to receive the metered rate therefrom, to a position adjacent the feed end of the respective supply duct, each material flow control duct comprising a substantially closed duct mounted within the enclosure such that at least some air flow from the air duct passes through the enclosure externally of the material flow control duct to enter the feed end of the supply duct externally of the material flow control duct.

9. The machine according to claim 8 wherein there is provided a second supply container and a second metering system for metering the particulate material from the second container into each of the supply ducts, the second metering system including a second discharge roller assembly arranged at the second supply container and being rotatable to effect discharge of a metered rate of the particulate material from the second supply container, the second metering system being arranged to supply from the second discharge roller assembly to the respective flow control duct, each of the supply ducts therefore being arranged to receive material from the first supply container and the second supply container for transportation the material to the feed opening of the respective supply duct.

10. The machine according to claim 9 wherein each material flow control duct comprises an elongate pipe which has a first opening at the discharge roller of the first container, a second opening at the discharge roller of the second container and a third opening for discharging into the feed end of the respective supply duct, and wherein the pipe is declined such that the material passes therethrough by gravity.

11. An agricultural machine comprising:

a first supply container for a first particulate material for distribution on the machine;

a plurality of first supply ducts for distributing the first particulate material, each supply duct having a feed end and extending to a respective one of a plurality of ground engaging elements on the machine;

a first metering system for metering the a first particulate material from the first container into each of the first supply ducts;

a second supply container for a a second particulate material for distribution on the machine;

a plurality of second supply ducts for distributing the a second particulate material, each supply duct having a feed end and extending to a respective one of the ground engaging elements on the machine such that each ground engaging element is supplied with seeds by a respective one of the first supply ducts and with a second particulate material by a respective one of the second supply ducts;

a second metering system for metering the a second particulate material from the second container into each of the second supply ducts;

an airflow generator for generating an airflow;

the airflow generator being connected to a first air supply duct system for at least communicating air to the first supply ducts for transporting the seeds therealong;

the airflow generator being connected to a second air supply duct system for communicating air to the second container for pressurizing the second container and for communicating air to the second supply ducts for transporting the a second particulate material therealong;

and a heater for supplying heat to the air in the second air supply duct system for drying the air in contact with the a second particulate material.

12. The machine according to claim 11 wherein the heater is arranged to supply heated air only to the second air supply duct system so that the first air duct supply system for the seeds remains unheated.

13. The machine according to claim 11 wherein the heater is mounted in a duct of the second air supply duct system so as to effect heating of air passing through the duct.

14. An agricultural machine comprising:

a supply container for a particulate material for distribution on the machine;

a plurality of supply ducts for distributing the particulate material;

an airflow generator for generating an airflow for supply to the supply ducts for transporting the particulate material therealong;

a metering system for metering the particulate material from the container into each of the supply ducts;

the container comprising a tank with a substantially horizontal top and an inlet opening in the top through which material can be fed for filling the tank;

and a cover for the inlet opening in the top, the cover comprising:

a substantially vertical post at one side of the inlet opening;

a cover panel shaped to cover the inlet opening and to define therewith a seat in which the cover panel is located in place on the inlet opening;

an arm having a first end mounted on the post for vertical movement along the post and for rotational movement about a vertical axis longitudinally of the post and a second end connected to the cover panel such that the cover panel is supported in cantilever manner from the post and such that the cover panel is maintained in a plane substantially at right angles to the post;

and a lift actuator for effecting said vertical movement along the post in a first upward direction for vertically lifting the cover panel from the seat to a raised position in which the cover panel is rotatable around said vertical axis to an open position and in a second downward direction in which the arm applies pressure onto the cover panel to locate the cover panel on said seat.

15. The machine according to claim 14 wherein the second end of the arm is fixed to the cover panel.

16. The machine according to claim 14 wherein the height of the cover panel relative to the arm can be adjusted to vary the pressure of the cover panel when on the seat.

17. The machine according to claim 16 wherein the post includes an end member mounted thereon for rotational movement with the arm and mounted on the post at a fixed axial position thereon such that the lift actuator operates between the arm and the end member.

18. The machine according to claim 17 wherein there is provided a spring support between the end member and the arm at a position on the arm spaced outwardly from the post.

19. The machine according to claim 16 wherein the cover panel is rectangular in plan and wherein the post is arranged at one corner.

20. An agricultural machine comprising:
a first supply container for a first particulate material for distribution on the machine, the first supply container having a width across the machine, a front and a rear;
a second supply container for a first particulate material for distribution on the machine, the second supply container having a width across the machine, a front and a rear;
a plurality of first supply ducts for distributing the first and second particulate materials, each first supply duct having a feed end and extending to a respective one of a plurality of first use locations on the machine and being separate from the others of the first supply ducts, the first use locations being arranged at spaced positions on the machine;
the first supply ducts being arranged such that the feed ends thereof are arranged in a single row across the width of the first and second containers and underneath the first and second containers for receiving the first and second materials therefrom;
a first metering system for metering the first particulate material from the first container into each the feed end of each of the first supply ducts;
a second metering system for metering the second particulate material from the second container into the feed end of each of the first supply ducts;
a third supply container for a third particulate material for distribution on the machine, the third supply container having a width across the machine, a front and a rear;
a fourth supply container for a fourth particulate material for distribution on the machine, the fourth supply container having a width across the machine, a front and a rear;
a plurality of second supply ducts for distributing the third and fourth particulate materials, each second supply duct having a feed end and extending to a respective one of a plurality of second use locations on the machine and being separate from the others of the second supply ducts, the second use locations being arranged adjacent to but spaced from respective ones of the first use locations;
the second supply ducts being arranged such that the feed ends thereof are arranged in a single row across the width of the third and fourth containers and underneath the third and fourth container for receiving the third and fourth materials therefrom;
a third metering system for metering the third particulate material from the third container into each the feed end of each of the second supply ducts;
a fourth metering system for metering the fourth particulate material from the fourth container into the feed end of each of the second supply ducts;
an airflow generator for generating an airflow for supply to the first and second supply ducts for transporting the particulate material therealong;
the first, second, third and fourth containers being arranged in a row each in front of the next with the widths of the containers substantially aligned and with the row of feed ends of the first supply ducts parallel to and aligned with the row of feed ends of the second supply ducts.

21. An agricultural machine comprising:
a first supply container for a first particulate material for distribution on the machine, the first supply container having a width across the machine, a front and a rear;
a second supply container for a first particulate material for distribution on the machine, the second supply container having a width across the machine, a front and a rear;
a plurality of first supply ducts for distributing the first and second particulate materials, each first supply duct having a feed end and extending to a respective one of a plurality of first use locations on the machine and being separate from the others of the first supply ducts, the first use locations being arranged at spaced positions on the machine;
the first supply ducts being arranged such that the feed ends thereof are arranged in a single row across the width of the first and second containers and underneath the first and second containers for receiving the first and second materials therefrom;
a first metering system for metering the first particulate material from the first container into each the feed end of each of the first supply ducts;
a second metering system for metering the second particulate material from the second container into the feed end of each of the first supply ducts;
a third supply container for a third particulate material for distribution on the machine, the third supply container having a width across the machine, a front and a rear;
a fourth supply container for a fourth particulate material for distribution on the machine, the fourth supply container having a width across the machine, a front and a rear;
a plurality of second supply ducts for distributing the third and fourth particulate materials, each second supply duct having a feed end and extending to a respective one of a plurality of second use locations on the machine and being separate from the others of the second supply ducts, the second use locations being arranged adjacent to but spaced from respective ones of the first use locations;
the second supply ducts being arranged such that the feed ends thereof are arranged in a single row across the width of the third and fourth containers and underneath the third and fourth container for receiving the third and fourth materials therefrom;
a third metering system for metering the third particulate material from the third container into each the feed end of each of the second supply ducts;
a fourth metering system for metering the fourth particulate material from the fourth container into the feed end of each of the second supply ducts;
an airflow generator for generating an airflow for supply to the first and second supply ducts for transporting the particulate material therealong;
the first, second, third and fourth containers being arranged in a row each in front of the next with the widths of the containers substantially aligned and with the row of feed ends of the first supply ducts parallel to and aligned with the row of feed ends of the second supply ducts;
each of the containers being closed and having an air supply thereto such that each of the containers can be pressurized;
each of the second and third containers having a bottom portion at which the respective one of the second and third metering systems is located;
and a movable divider wall between the second container and the third container, the divider wall being movable between a first position closing a bottom portion of the second container and maximizing the third container such that all material in the second and third containers is communicated to the third metering system, a second position in which the first and second containers are divided with the bottom portions of both open to receive respective materials at the second and third metering systems and a third position closing a bottom portion of the third container and maximizing the second container such that all material in the second and third containers is communicated to the second metering system.

22. The machine according to claim 21 wherein the second and third containers include a fixed upper wall portion dividing the second container from the third container, the divider wall being pivotal about a bottom edge and having a top edge arranged, in the second position, to engage and seal against a bottom edge of the fixed upper wall portion.

* * * * *